United States Patent [19]

Dixon

[11] Patent Number: 4,602,537
[45] Date of Patent: Jul. 29, 1986

[54] AUTOMATIC ASSEMBLY MACHINE
[75] Inventor: Paul H. Dixon, Belvidere, Ill.
[73] Assignee: Dixon Automatic Tool, Inc., Rockford, Ill.
[21] Appl. No.: 734,579
[22] Filed: May 15, 1985
[51] Int. Cl.⁴ .............................................. B25B 23/04
[52] U.S. Cl. ......................................... 81/430; 81/435
[58] Field of Search ....................... 81/430, 435, 57.37

[56] References Cited

U.S. PATENT DOCUMENTS

| | | | |
|---|---|---|---|
| 2,689,589 | 9/1954 | Allen et al. | 81/57.37 |
| 2,969,587 | 1/1961 | Dixon . | |
| 2,973,848 | 3/1961 | Dixon | 192/56 |
| 2,989,996 | 6/1961 | Dixon . | |
| 3,279,045 | 10/1966 | Dixon . | |
| 3,583,451 | 6/1971 | Dixon | 81/57.37 |
| 3,620,106 | 11/1971 | Dixon | 81/121 |
| 3,675,302 | 7/1972 | Dixon . | |
| 3,929,176 | 12/1975 | Dixon | 81/430 |
| 4,002,265 | 1/1977 | Dixon | 221/210 |

FOREIGN PATENT DOCUMENTS 820001 9/1959 United Kingdom ............... 81/57.37

Primary Examiner—James L. Jones, Jr.
Attorney, Agent, or Firm—Leydig, Voit & Mayer, Ltd.

[57] ABSTRACT

An automatic assembly machine with a rotatable socket adapted to be advanced downwardly through an active stroke to drive a hex head screw into a workpiece. Screws are supplied one at a time to the socket by a loading mechanism having a pair of jaws adapted to close and open to grip and release a screw. While the jaws are closed, a screw is forcibly blown into the jaws through a pneumatic supply tube. As the socket retracts, the jaws are shifted transversely inwardly toward the socket and move beneath the socket as soon as the socket moves upwardly past the jaws. Thereafter, the jaws are moved upwardly along the same path as the socket but at a speed greater than the speed of the socket to enable the jaws to overtake the socket and place the screw into the socket. When the socket starts its downstroke, the jaws move downwardly away from the socket and are cammed open to release the screw. Thereafter, the jaws are shifted transversely from beneath the socket and are shifted to the supply tube to receive the next screw.

15 Claims, 25 Drawing Figures

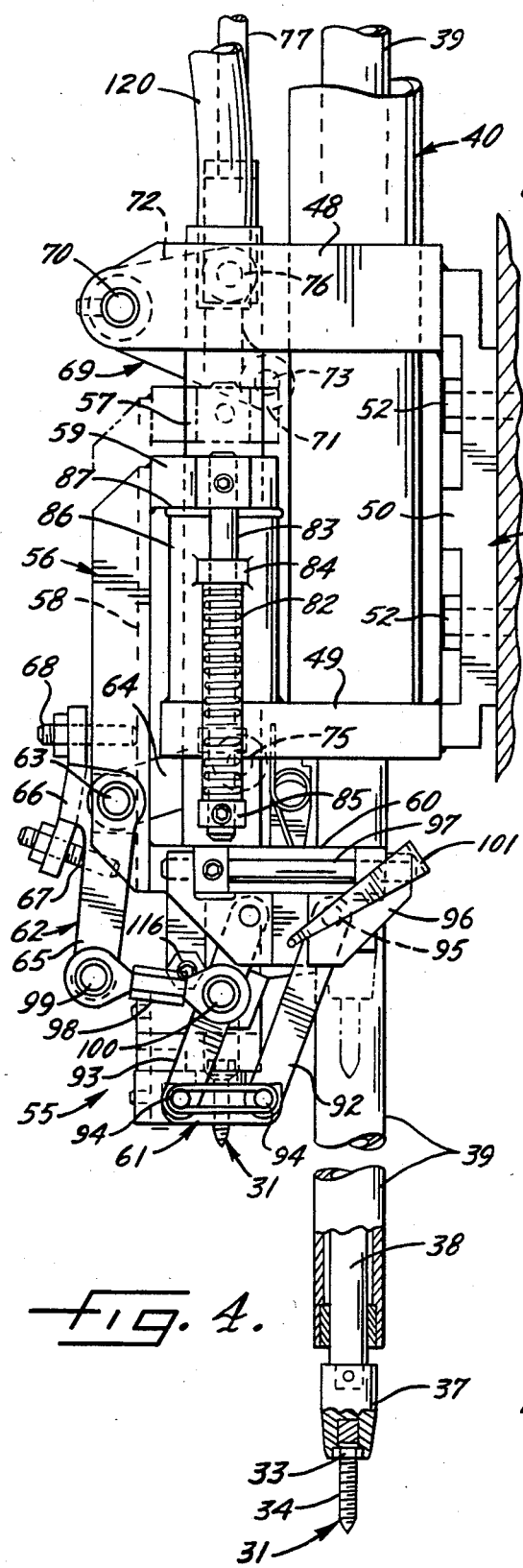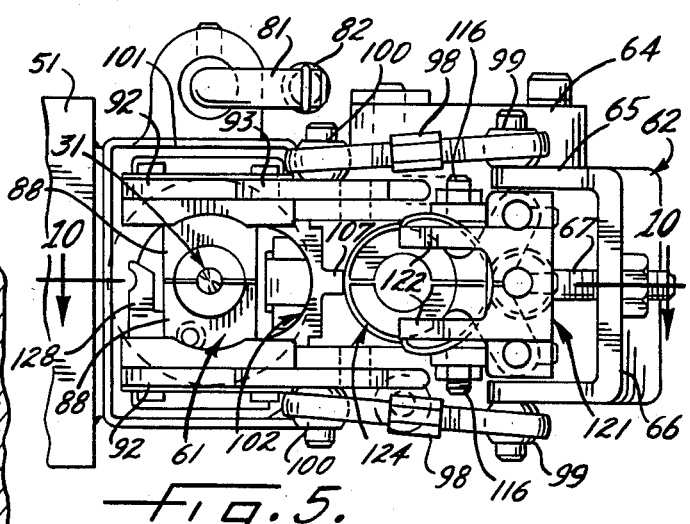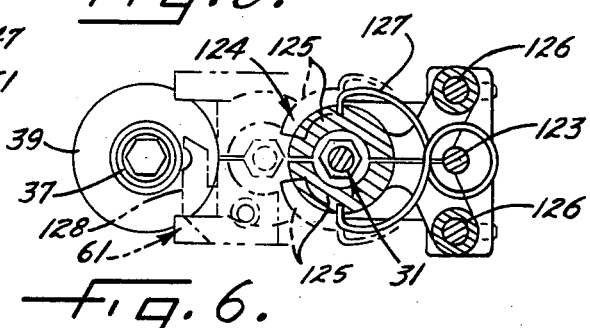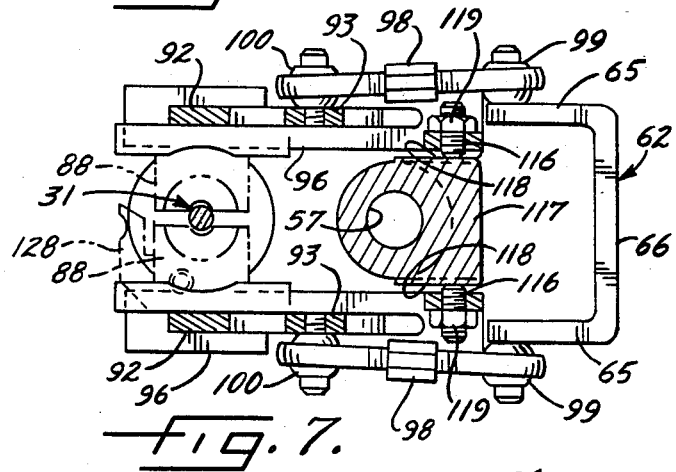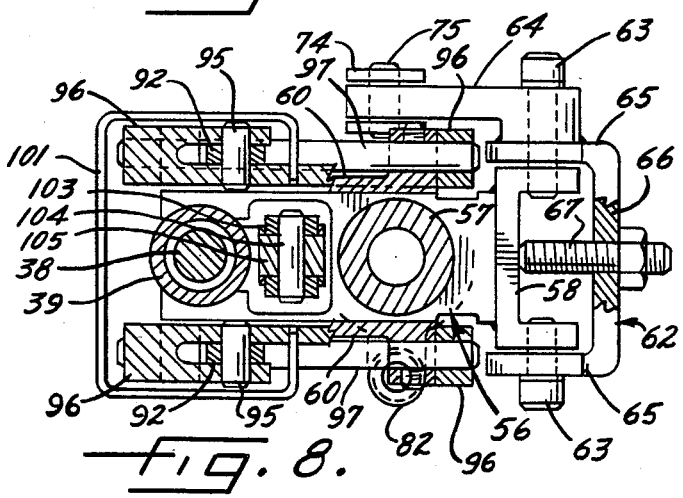

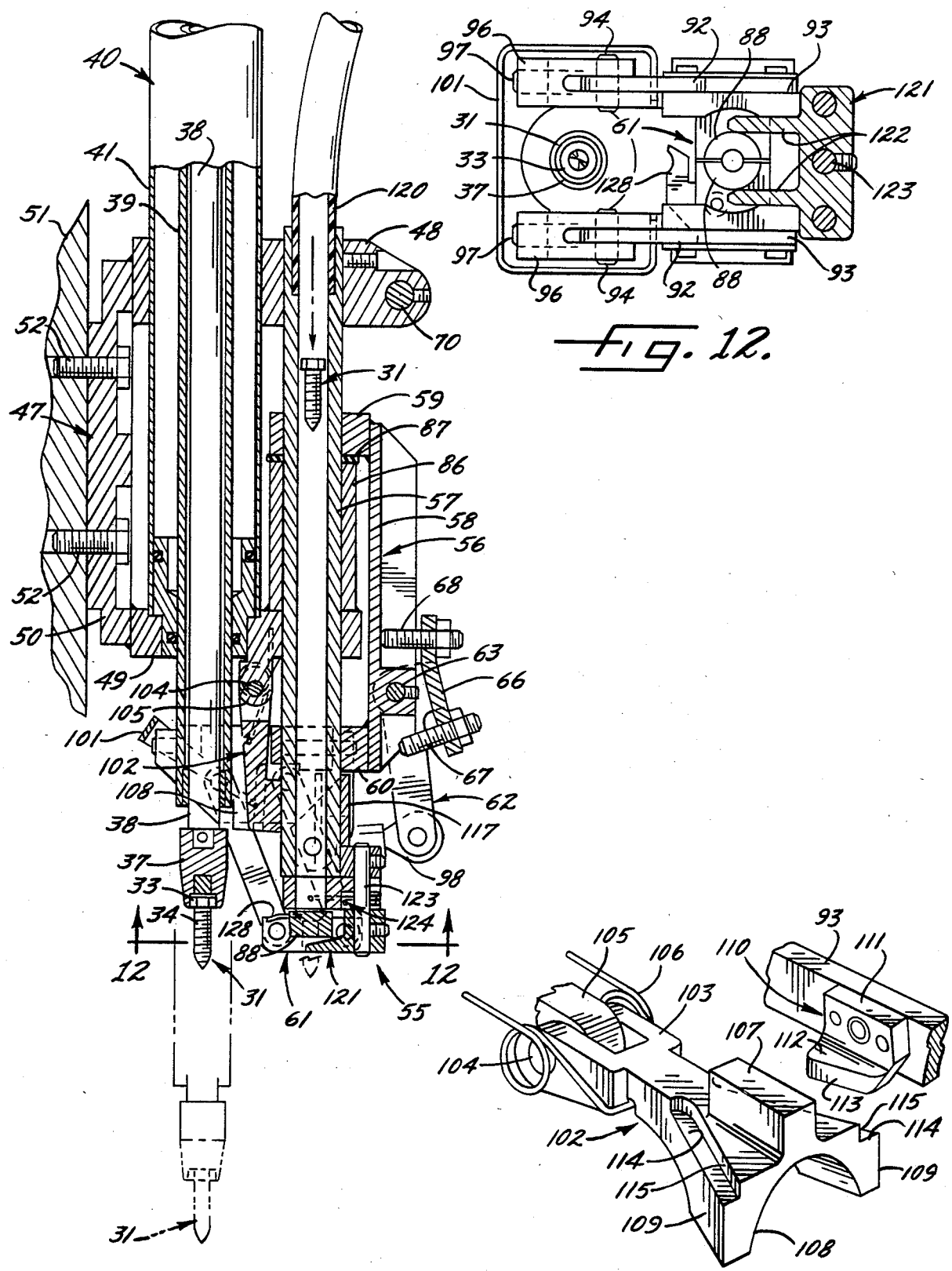

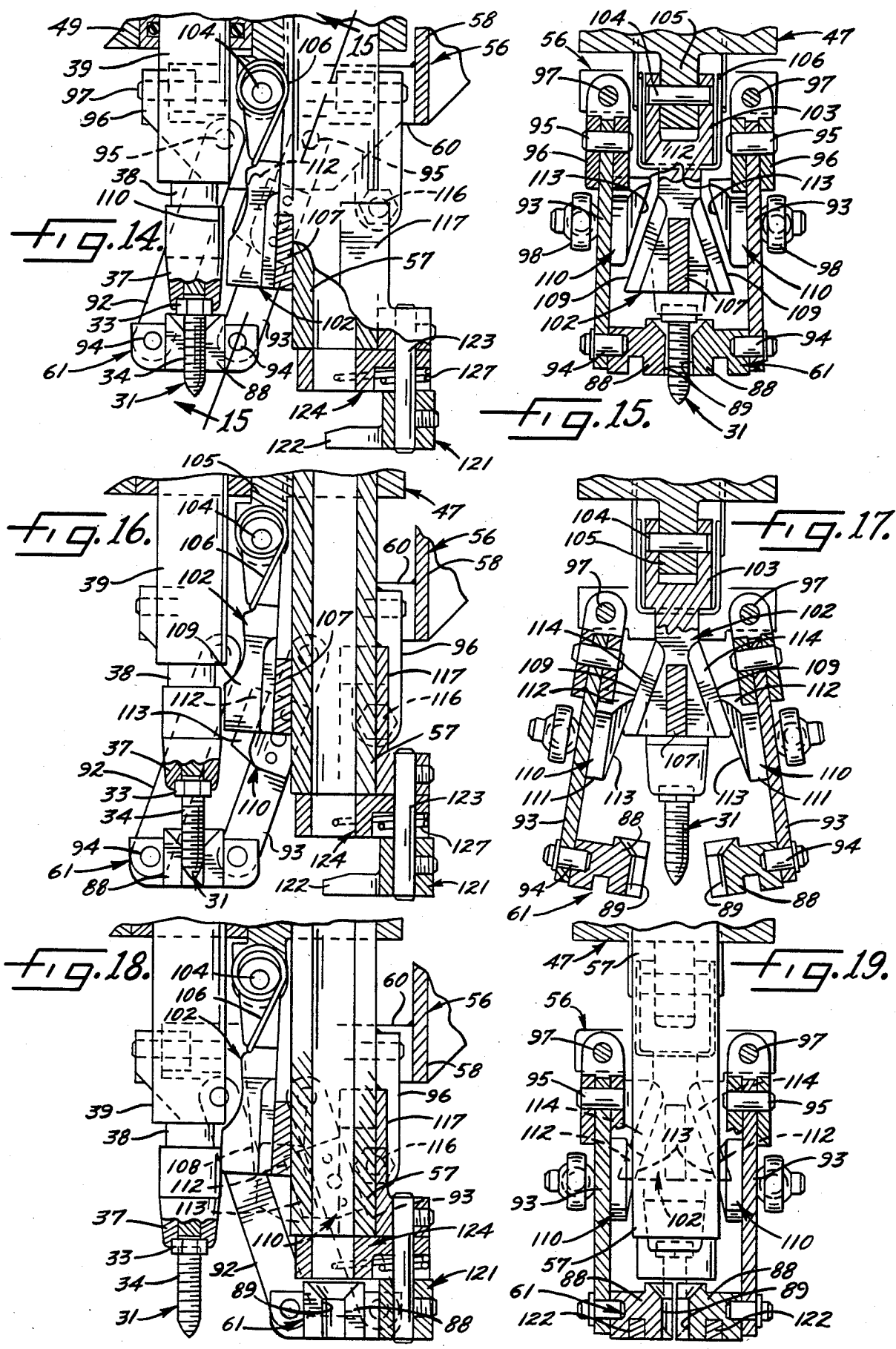

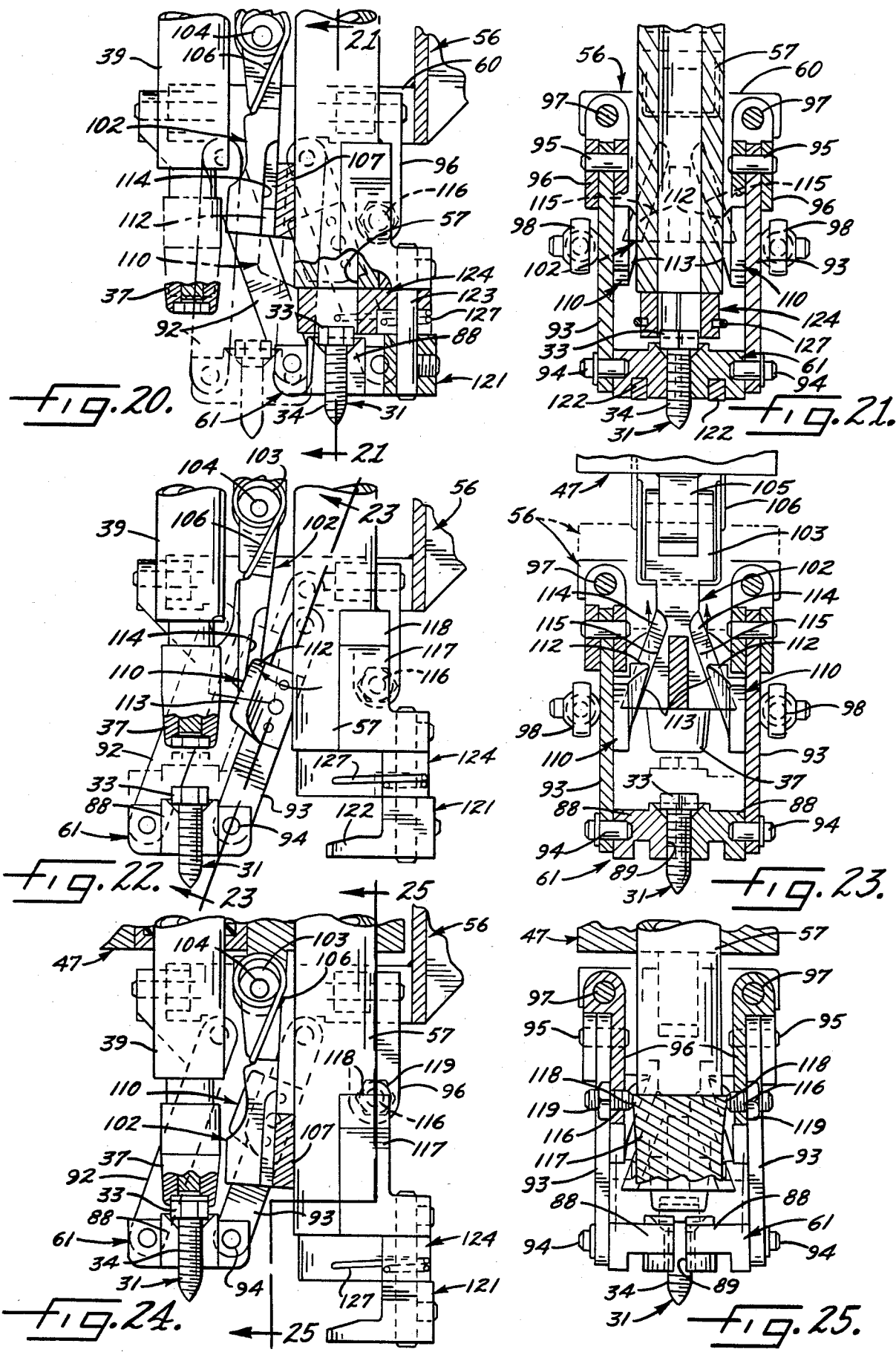

4,602,537

AUTOMATIC ASSEMBLY MACHINE

BACKGROUND OF THE INVENTION

This invention relates generally to an automatic assembly machine in which a reciprocating driver automatically assembles a fastener such as a screw with a workpiece. Automatic assembly machines of this general type are disclosed in Dixon U.S. Pat. Nos. 2,973,848; 3,297,045; 3,675,302 and 4,002,265.

More particularly, the invention relates to an automatic assembly machine of the type disclosed in Dixon U.S. Pat. No. 3,620,106. In that machine, the fastener is a hex head screw adapted to be driven by a wrench-type socket carried on the end of a rotatable and reciprocable spindle. As explained in the '106 patent, the machine disclosed therein makes available only a very short time interval for the socket to acquire the hex head of the fastener, that is, for the socket to mate angularly and move into proper face-to-face driving engagement with the head.

SUMMARY OF THE INVENTION

The general aim of the present invention is to provide a new and improved automatic assembly machine which preferably is equipped with a socket-type driver and which, when compared with prior machines, is capable of more reliably acquiring the fastener, is capable of operating at higher speeds and is capable of making a longer stroke into restricted areas.

A more detailed object of the invention is to provide a machine in which the fastener is delivered into driving relation with the fastener driver during the return stroke of the driver so as to provide more time for the driver to acquire the fastener and to enable better control of the fastener at high cycle rates.

A further object is to provide a novel loading mechanism which overtakes the driver during the return stroke of the driver and places the fastener in full and proper driving relation with the driver while the latter is returning. The loading mechanism may be spaced a considerable distance from the workpiece and leaves the driver free to advance through a relatively long stroke and into restricted areas.

Still another object of the invention is to provide a novel loading mechanism with spring-loaded jaws which normally are closed to control the fastener, which are momentarily opened by a unique cam and cam follower combination when shifted in one direction and which bypass the cam and remain closed when returned in the opposite direction.

In more detailed aspects, the invention resides in novel mechanisms for positively holding the spring-loaded jaws in closed positions while a fastener is loaded into the jaws, for controlling the fastener while it is loaded into the closed jaws and for ejecting any undriven fasteners from the driver.

These and other objects and advantages of the invention will become more apparent from the following detailed description when taken in conjunction with the accompanying drawings.

BRIEF DESCRIPTION OF THE DRAWINGS

FIG. 4 is an enlarged fragmentary elevational view of certain parts of the machine as taken along the line 4—4 of FIG. 3 with the socket fully advanced.

FIG. 5 is an enlarged bottom plan view of the machine as taken along the line 5—5 of FIG. 1.

FIGS. 6, 7 and 8 are enlarged cross-sections taken substantially along the lines 6—6, 7—7 and 8—8, respectively, of FIG. 1.

FIG. 11 is a view similar to FIG. 10 but shows the socket advanced downwardly through its next step.

FIG. 12 is a cross-section taken substantially along the line 12—12 of FIG. 11.

FIG. 13 is a perspective view of the cam and one of the cam followers for opening the jaws.

FIG. 14 is an enlarged view of parts illustrated in FIG. 9 but shows the socket at the very top of its stroke prior to being advanced, certain parts being broken away and shown in section.

FIG. 15 is a fragmentary cross-section taken substantially along the line 15—15 of FIG. 14.

FIGS. 16 and 17 are views similar to FIGS. 14 and 15, respectively, but show the socket advanced downwardly through its first step.

FIGS. 18 and 19 are also views similar to FIGS. 14 and 15, respectively, but show the socket advanced downwardly through its next step.

FIG. 20 is another view similar to FIG. 14 but shows the socket as the latter starts to retract through the final portion of its upstroke.

FIG. 21 is a fragmentary cross-section taken substantially along the line 21—21 of FIG. 20.

FIG. 22 is a view similar to FIG. 20 but shows the socket during the next step of its upstroke.

FIG. 23 is a fragmentary cross-section taken substantially along the line 23—23 of FIG. 22.

FIG. 24 is another view similar to FIG. 20 but shows the socket during the final step of its upstroke.

FIG. 25 is a fragmentary cross-section taken substantially along the line 25—25 of FIG. 24.

DETAILED DESCRIPTION OF THE PREFERRED EMBODIMENT

Figure 1:
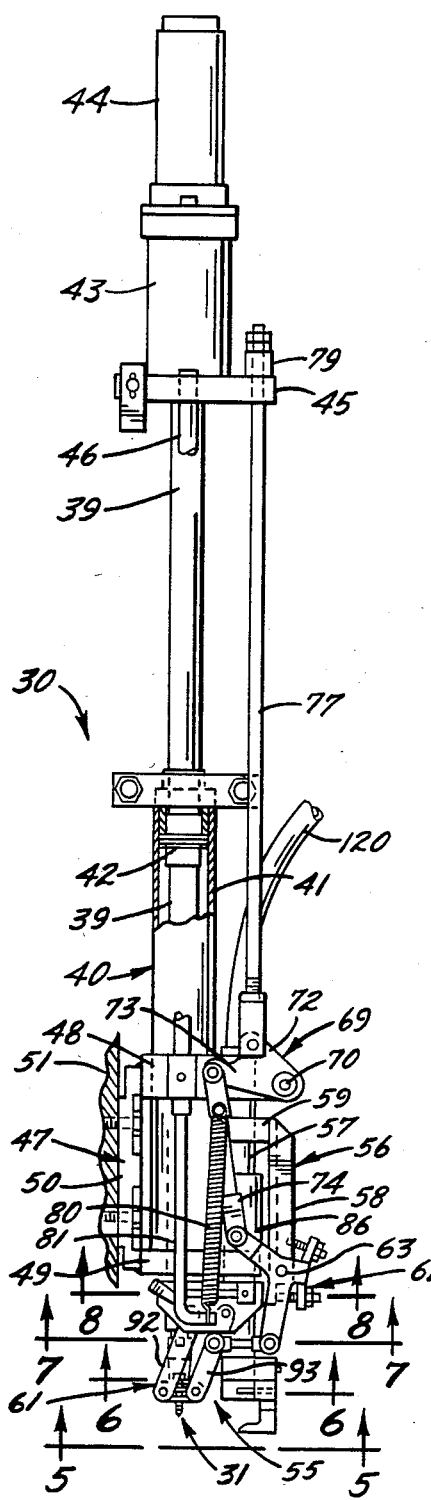
FIG. 1 is a side elevational view of a new and improved automatic assembly machine incorporating the unique features of the present invention and shows the socket in a fully retracted position.

As shown in the drawings for purposes of illustration, the invention is embodied in an assembly machine 30 for rapidly and automatically assembling fasteners 31 with at least one workpiece 32. While the machine is capable of driving fasteners of various types, it is particularly suitable for use with polygonal fasteners such as a polygonal nut or a screw with a polygonal head. The specific fastener which has been illustrated is a screw having a hexagonal head 33 and a threaded shank 34 (see FIG. 4).

The machine 30 also is capable of being used with workpieces 32 of various types. The particular workpiece which has been shown is a piece of sheet metal having a relatively narrow and relatively deep pocket 35 whose bottom receives the screw 31. While the screw could simply thread into the bottom of the pocket, it has been illustrated herein as being used to attach the workpiece 32 to a plate 36 or other member. Also, the screw has been illustrated as being driven vertically but it will be appreciated that the machine 30 could be oriented to drive the screw horizontally or at any desired angle between vertical and horizontal.

Figure 3:
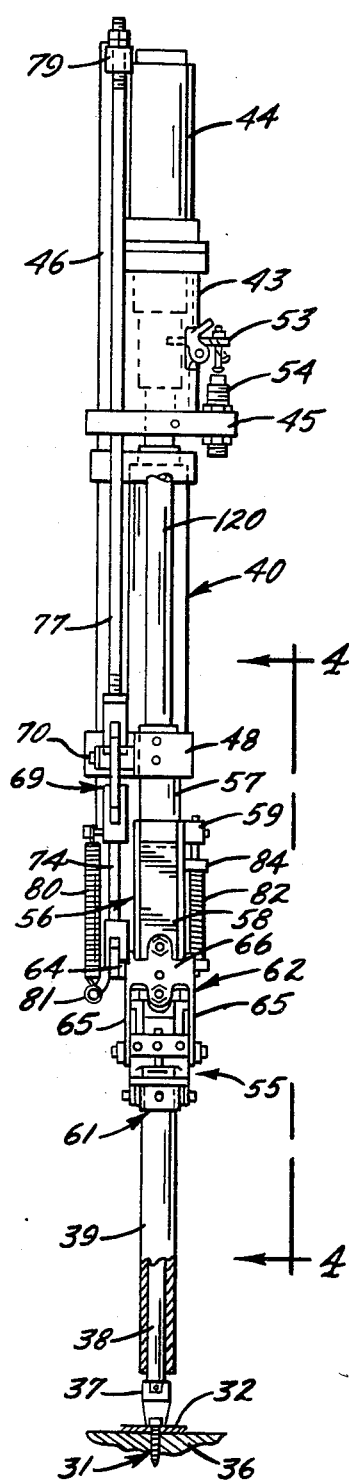
FIG. 3 is an elevational view taken from the right of FIG. 2 and shows the socket advanced to fully drive the fastener.

To drive the screws 31, the machine 30 includes a driver in the form of a magnetic socket 37 having a hexagonal internal cross-section for receiving and turning the hex head 33 of the screw. The socket is adapted to be advanced downwardly through an active or driving stroke, is adapted to be retracted upwardly through a return stroke and is adapted to be rotated about its own axis. For these purposes, the socket is carried on the end of an elongated and vertically extending spindle 38 (FIGS. 3 and 4) which is supported to reciprocate with and rotate within a vertically extending quill 39. The quill forms part of a reciprocating pneumatic actuator 40 having a cylinder 41 (FIG. 1) which slidably receives the quill. A piston 42 is secured to the quill and is advanced downwardly to shift the socket 37 through its driving stroke when pressurized air is admitted into the upper end of the cylinder. Upward retraction of the socket through its return stroke is effected when pressurized air is admitted into the lower end of the cylinder.

Figure 10:
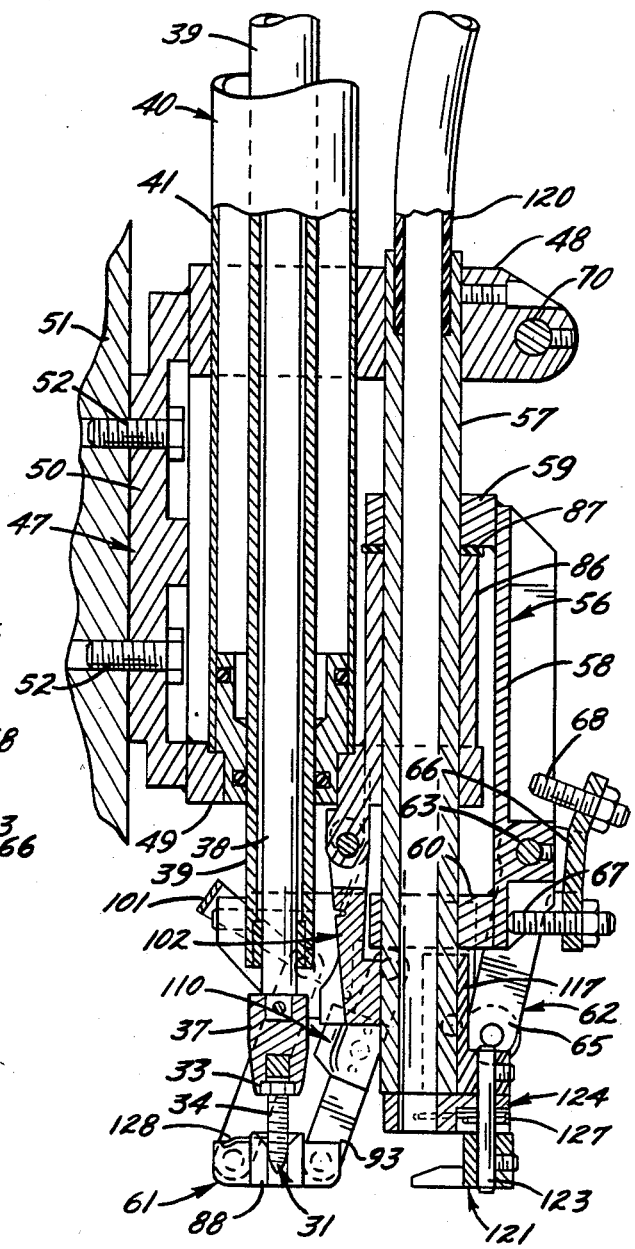
FIG. 10 is a fragmentary cross-section taken substantially along the line 10—10 of FIG. 5 and also shows the socket advanced downwardly through its first step.

The quill 39 extends upwardly through the cylinder 41 and its upper end supports a torque-limiting clutch 43 and a rotary air motor 44 whose drive shaft is coupled to the spindle 38 by way of the clutch. The lower end of the clutch carries a collar 45 which is mounted to slide upwardly and downwardly on a vertically extending guide rod 46 fixed to a generally U-shaped mounting bracket 47 having generally horizontal and outwardly projecting upper and lower arms 48 and 49 which support the actuator 40. In addition, the mounting bracket includes an upright plate 50 which is anchored to a fixed support member or block 51 by screws 52 (FIG. 10).

Figure 2:
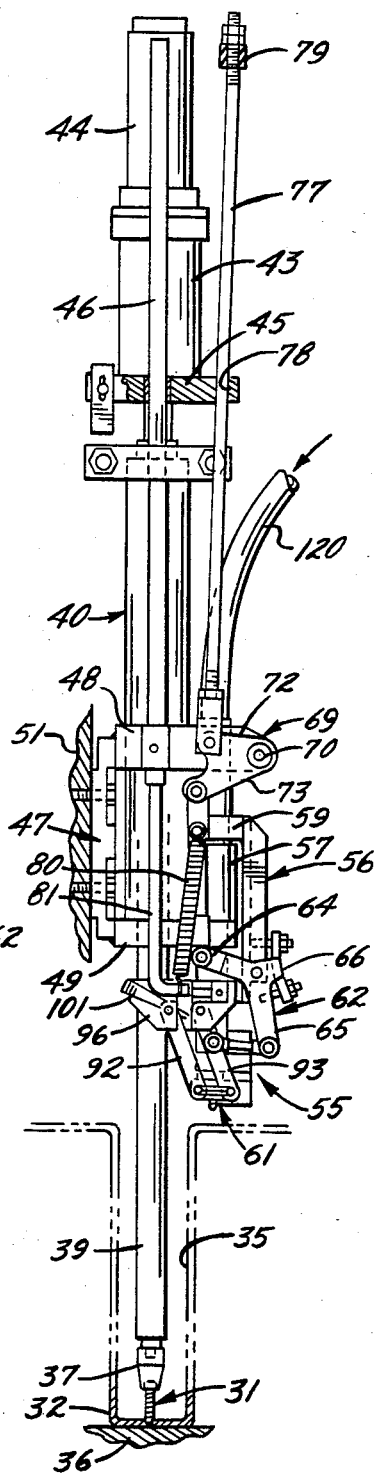
FIG. 2 is a view similar to FIG. 1 but shows the socket advanced downwardly to start driving the fastener.

Downward shifting of the socket 37 from its fully retracted position shown in FIG. 1 is initiated by causing the actuator 40 to shift the quill 39 downwardly, the actuator being controlled either by a manually operable control (not shown) or automatically by a position signal indicating that the workpiece 32 and plate 36 are properly located beneath the socket. The rotary air motor 44 rotates the socket by way of the clutch 43 and the spindle 38 as the socket and quill move downwardly into the pocket 35 of the workpiece 32 as shown in FIG. 2 to cause the screw 31 carried in the socket to engage the bottom of the pocket. When the screw is fully driven and is tightened to a preset torque level (see FIG. 3), a torque-responsive lever 53 associated with the clutch 43 trips downwardly to a position adjacent a proximity switch 54 on the collar 45 so as to cut off the rotary air motor 44 and reverse the pneumatic actuator 40 in order to retract the spindle and socket back toward the position shown in FIG. 1. During such retraction, the rotary motor 44 is re-started and, when the socket is fully retracted, a proximity switch (not shown) produces a signal to cut off the actuator 40 preparatory to the next downward stroke.

In accordance with the present invention, the machine 30 includes a unique screw loading mechanism 55 which positively places the screw 31 into the socket 37 during the upstroke of the socket. As a result of the positive placement of the screw into the socket during the upstroke, the socket is better able to quickly and reliably "acquire" the hex head 33 of the screw, that is, to establish proper driving relation with the head. In addition, the loading of the screw into the socket during the upstroke of the socket enables the loading mechanism 55 to be located well above the workpiece 32 while permitting the socket to move at high speed through a relatively long downstroke free of the loading mechanism. Thus, the machine 30 may drive screws into restricted areas such as the narrow and deep pocket 35 without interference from the loading mechanism.

More specifically, the loading mechanism 55 includes a vertically movable and generally U-shaped carriage 56 which is supported to slide upwardly and downwardly on a vertical tube 57 (FIG. 10), the carriage thus being adapted to move in a path which extends parallel to that traveled by the socket 37. The carriage comprises an upright plate 58 supporting upper and lower collars 59 and 60 which are slidably received on the tube 57. The tube extends between and is supported by the arms 48 and 49 of the mounting bracket 47 and is located on the "outer" side of the actuator 40, that is, the side opposite the mounting plate 50 of the bracket 47. As will be explained in detail below, the tube is used to supply screws 31 one at a time to the loading mechanism 55 for subsequent delivery of each screw by the loading mechanism to the socket 37.

Figure 9:
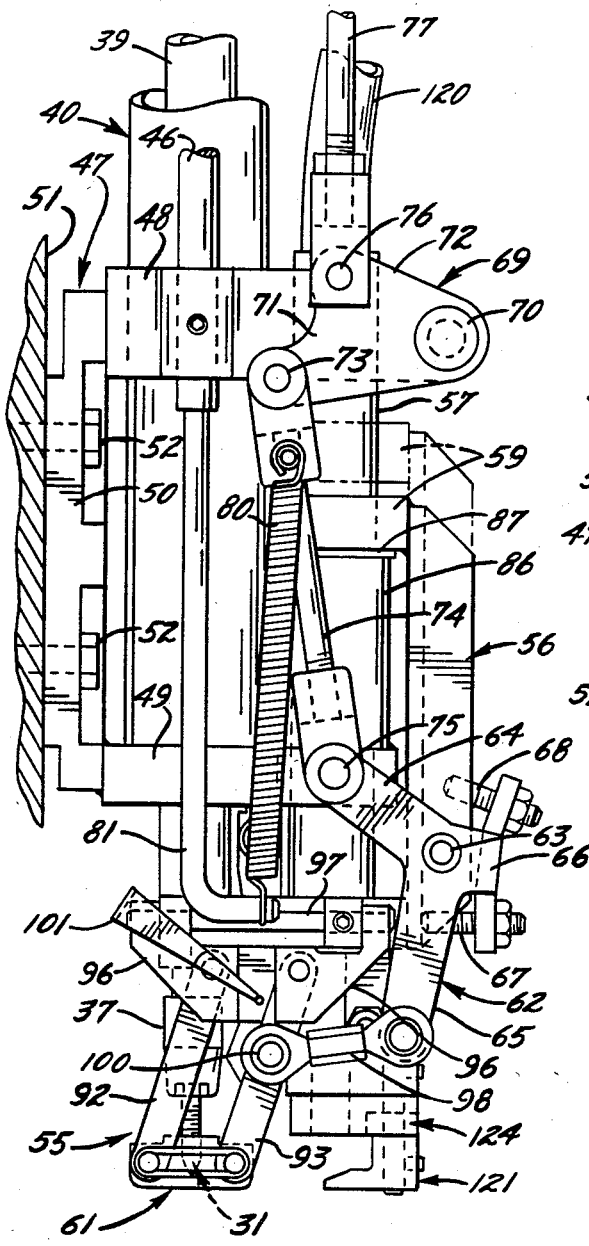
FIG. 9 is an enlarged fragmentary elevational view of certain parts of the machine illustrated in FIG. 1 but shows the socket advanced downwardly through the first step from the top of its stroke.

The carriage 56 of the loading mechanism 55 supports a holder or jaw unit 61 which is adapted to receive a screw 31 from the supply tube 57 and shift the screw tranversely into the path traveled by the socket 37 (compare FIGS. 20 and 22). After the screw has been placed in the socket, the jaw unit is shifted tranversely out of the path of the socket and is returned to the supply tube to receive another screw from the tube (compare FIGS. 16 and 18). Inward and outward shifting of the jaw unit is effected in response to swinging of a bellcrank 62 (FIGS. 1, 3, 4 and 9) which is pivotally connected to the carriage at 63, the bellcrank having a single upper arm 64 and having two spaced lower arms 65 somewhat greater in length than the upper arm. The bellcrank is formed with a flange 66 which spans the upper end portions of the two lower arms 65 and which carries two adjustable stop screws 67 and 68. The screw 67 engages the plate 58 of the carriage 56 to stop clockwise (FIG. 9) pivoting of the bellcrank and inward movement of the jaw unit 61 while the screw 68 engages the plate 58 to stop counterclockwise pivoting of the bellcrank and outward movement of the jaw unit.

When the socket 37 is fully retracted as shown in FIG. 1, the carriage 56 of the loading mechanism 55 is held in an uppermost fully retracted position while the jaw unit 61 of the loading mechanism is in its fully innermost extended position beneath the socket and is holding a screw 31 in the socket (see FIGS. 14 and 15). During the initial part of the downstroke of the socket, the carriage and jaw unit first are shifted linearly and downwardly through a short distance, the jaw unit releases the screw in the socket and then the jaw unit is shifted outwardly from beneath the socket and is moved to the delivery tube 57 to receive the next screw (see FIG. 18). During the final portion of the upstroke of the socket, the jaw unit with the newly acquired screw first is shifted inwardly to a position beneath the socket (compare FIGS. 20 and 22) and then the jaw unit and the carriage are shifted upwardly and linearly to enable the jaw unit to place the screw in the socket as shown in FIGS. 22 and 24. During such shifting, the jaw unit moves along a path coinciding with that traveled by the socket.

For these purposes, a bellcrank 69 (FIGS. 1, 4 and 9) is pivotally connected to the upper arm 48 of the bracket 47 at 70 and is formed with two angularly spaced arms 71 and 72. The lower arm 71 of the bellcrank 69 is pivotally connected at 73 (FIG. 9) to the upper end of a link 74 whose lower end is pivotally connected at 75 to the upper arm 64 of the bellcrank 62. The upper arm 72 of the bellcrank 69 is pivotally connected at 76 to the lower end of an upright rod 77. As shown in FIG. 2, the rod extends loosely through a hole 78 in the collar 45 and carries a rubber bumper 79 near its upper end. The bumper is urged downwardly against the upper side of the collar by a contractile spring 80 (FIG. 9) which acts to pivot the bellcrank 69 counterclockwise and to pull the rod 77 downwardly. One end of the spring is connected to the link 74 while the other end of the spring is hooked around an L-shaped rod 81 which forms a rigid extension of the fixed guide rod 46. Another spring 82 (FIG. 4), a compression spring, is telescoped over a rod 83 which is fixed to and depends from the outside of the collar 59 and which extends slidably through an ear 84, the spring being compressed between the ear and a fixed stop collar 85 on the lower end of the rod. The ear 84 is rigid with a sleeve 86 which is attached to and projects upwardly from the lower arm 49 of the mounting bracket 47 in surrounding relation with the delivery tube 57.

When the socket 37 is in its fully retracted position shown in FIG. 1, the upper collar 59 of the carriage 56 is spaced upwardly from a resilient washer 87 on the upper end of the sleeve 86 by a distance of about $\frac{3}{4}''$ (see the phantom line illustration in FIG. 4). In the fully retracted position of the socket, the spring 80 is fully stretched between the link 74 and the rod 81 while the spring 82 is fully compressed between the ear 84 and the stop collar 85.

When the socket 37 is advanced downwardly by the actuator 40 from the position shown in FIG. 1, the collar 45 tends to move downwardly away from the bumper 79. During such movement, the contractile spring 80 acts through the link 74 to pull on the bellcrank 71 and the rod 77 and, at the same time, the compression spring 82 acts between the ear 84 and the collar 85 to shift the rod 83, the carriage 56 and the jaw unit 61 downwardly relative to the mounting bracket 47. Downward movement of the carriage and jaw unit is stopped when the upper collar 59 engages the washer 87 on the sleeve 86 (see FIG. 10) and thereafter the socket 37 continues to shift downwardly relative to the vertically stationary carriage and jaw unit. During the initial portion of such continued shifting, the spring 80 contracts further and acts through the link 74 to swing the bellcrank 62 and 69 counterclockwise (FIG. 9) until the stop screw 68 engages the plate 58 to stop further pivoting of the bellcranks and further downward movement of the rod 77. The jaw unit thus is retracted out of the path of the socket by the bellcrank 62 and is shifted to a position beneath the supply tube 57 to receive the next screw 31. The jaw unit remains in that position as the socket continues downwardly to drive the first screw and also remains stationary during virtually all of the upstroke of the socket. As the socket continues downwardly to drive the screw 31, the collar 45 moves downwardly away from the bumper 79 on the stopped rod 77 (see FIGS. 2 and 3).

When the socket is retracted and is about $\frac{3}{4}''$ away from the end of its upstroke, the collar 45 reengages the bumper 79 and pulls the rod 77 upwardly against the action of the spring 80. During the first approximately $\frac{1}{4}''$ of upward movement of the rod 77, it acts through the bellcrank 69, the link 74 and the bellcrank 62 to shift the jaw unit 61 inwardly to position the newly obtained screw 31 beneath the socket 37, the jaw unit stopping when clockwise pivoting (FIG. 9) of the bellcrank 62 is stopped by virtue of the screw 67 engaging the plate 58.

During the remaining $\frac{1}{2}''$ of the upstroke of the socket 37, the rod 77 acts through the bellcrank 72 and on the carriage 56 to shift the carriage and the jaw unit 61 upwardly as the socket travels upwardly. In keeping with the invention, the carriage and the jaw unit are shifted linearly upwardly at a speed greater than the speed of the socket so as to cause the jaw unit to catch up with and overtake the socket and thereby place the screw 31 in the socket. To this end, the arm 71 (FIG. 9) of the bellcrank 69 is significantly longer than the arm 72 of the bellcrank so as to amplify the motion of the rod 77 and to cause the carriage 56 to travel faster than the rod 77 once pivoting of the bellcrank 62 has been stopped by the screw 67. In this particular instance, the length ratio of the arms 71 and 72 is about 1.5 to 1. Thus, as the rod 77 moves upwardly its final $\frac{1}{2}''$ at the same speed as the socket 37, it pivots the bellcrank 72 which acts on the carriage 56 through the link 74 and the bellcrank 64 to cause the carriage and the jaw unit 61 to move upwardly at a faster rate than the socket and through about $\frac{3}{4}''$ (compare FIGS. 22 and 24). As a result, the jaw unit gradually places the head 33 of the screw in the socket as the latter rotates to "acquire" the head of the screw. Because the screw is placed in the socket while both the screw and the socket are moving upwardly, there is more time for the socket to acquire the head than is the case when a socket moves downwardly to a stationary screw. In addition, the socket is fully loaded at the completion of its upstroke and can immediately be shifted through the next downstroke without delay and without need of picking up a screw during such downstroke. The loading mechanism 55 does not travel with the socket during any substantial part of the driving stroke of the socket and thus the loading mechanism does not interfere with the socket placing the screw in the restricted pocket 35.

When the collar 45 engages the bumper 79 and starts pulling the rod 77 upwardly to pivot the bellcrank 69 clockwise (FIG. 9), the spring 80 is stretched and loaded preparatory to the next downstroke. In addition, the stop collar 85 compresses and loads the spring 82 when the carriage 56 moves upwardly during the final portion of the upstroke of the socket 37. Thus, when the socket is next moved downwardly, the spring 80 causes counterclockwise pivoting of the bellcrank 69 and the spring 82 causes downward movement of the carriage 56. Because of the length ratio of the arm 71 to the arm 72, the bellcrank 69 and the spring 82 coact to shift the carriage 56 downwardly at a rate faster than the socket during the first $\frac{1}{2}''$ of downward movement of the socket. As a result, the jaw unit 61 is shifted downwardly away from the advancing socket (compare FIGS. 14 and 16). When the carriage is stopped by the collar 59 engaging the washer 87, the spring 80 continues to contract and causes the bellcrank 62 to shift the jaw unit 61 outwardly during the final $\frac{1}{4}''$ of the first $\frac{3}{4}''$ of downward travel of the socket (see FIG. 18).

The jaw unit 61 comprises a pair of jaws 88 (FIGS. 16 and 17) located on opposite sides of the socket 37 and adapted to swing between closed positions gripping the shank 34 of the screw 31 and open positions releasing the screw. Each jaw 88 is formed with a cavity 89 having a portion which is complementary with the screw shank 34 but having an upwardly and outwardly beveled upper end portion. Accordingly, the lower end of the screw head 33 rests against the upper cavity portions as shown in FIGS. 20 and 21 when the jaws 88 are closed so that the upper end portion of the head protrudes above the jaws and may be placed in the socket 37.

To mount the jaws 88 to move transversely into and out of the path of the socket 37, two parallel links 92 and 93 (FIGS. 4 and 9) are pivotally connected at their lower ends at 94 to the inner and outer end portions of each jaw 88, there being one pair of links on each side of the socket 37. The upper ends of each pair of links 92 and 93 are pivotally connected at 95 to a transversely extending side bracket 96 which, in turn, is suspended from a transversely extending pin 97 attached to the lower collar 60 of the carriage 56. A dogbone link 98 is pivotally connected by a spherical bearing 99 to the lower end of each lower arm 65 of the bellcrank 62 and is pivotally connected by another spherical bearing 100 to the link 93 of each pair of links 92 and 93. Accordingly, when the bellcrank 62 is pivoted back and forth, it acts through the dogbone links 98 to swing the links 93 and thereby move the jaws 88 inwardly and outwardly. Because of the parallel relation of the links 92 and 93, the jaws move substantially horizontally as the links swing.

The side brackets 96 are supported on the pins 97 to swing about the axes of the pins. Thus, the jaws 88 may swing about the pins between their open and closed positions. A generally U-shaped leaf spring 101 (FIG. 8) straddles the inner ends of the two side brackets and has its inturned ends fixed to the side brackets so as to urge the jaws to swing toward one another to their closed positions.

Unique means are provided for swinging their jaws 88 to their open positions during the initial portion of the downstroke of the socket 37 so as to enable the jaws to release the screw 31 and swing clear of the downwardly moving socket. Such means, however, enable the jaws to remain closed during the final portion of the upstroke of the socket so that the jaws may place the screw in the socket and help control the screw until the start of the downstroke.

Herein, these means comprise a cam 102 (FIG. 13) formed at its upper end with a clevis 103 which is pivotally connected by a horizontal pin 104 to an ear 105 projecting downwardly from the lower arm 49 of the mounting bracket 47. The cam is supported by the pin 104 to swing inwardly and outwardly and is urged outwardly by a generally U-shaped torsion spring 106 anchored to the lower bracket arm 49 and bearing against the inner side of the cam adjacent the clevis 103. A stop rib 107 formed on the outer side of the cam is adapted to engage the inner side of the supply tube 57 to limit outward swinging of the cam. The inner side of the cam is formed with a pocket 108 of circular cross section which enables the cam to move inwardly into partially surrounding relation with the socket 37.

As shown in FIG. 13, the cam 102 flares and becomes wider as it progresses downwardly, the two outboard flaring side surfaces 109 of the cam defining cam surfaces. The cam surfaces 109 coact with cam followers 110, there being a cam follower fastened rigidly to the inboard side of each link 93. Each follower is formed with a mounting flange 111 and further is formed with a lip 112 having a following surface 113 which slopes toward the inboard side of the link 93 as it progresses downwardly and which is adapted at a certain time during a cycle to engage the adjacent cam surface 109 of the cam 102. In addition, the lips 112 of the followers 110 are adapted at a different time during a cycle to enter generally vertically elongated notches 114 formed in the outer side of the cam adjacent the cam surface 109, each notch having an upright wall 115 paralleling the adjacent cam surface 109.

When the socket 37 is in its fully retracted position shown in FIGS. 14 and 15, the jaws 88 are retracted fully upwardly, are substantially closed and help keep the screw 31 in controlled telescoping relation with the socket. At this stage of the cycle, the cam 102 is held outwardly against the supply tube 57 by the spring 106 while the cam followers 110 are spaced above the cam surfaces 109 and are free of engagement with the cam 102.

During the first ½" downstroke of the socket 37, the cam followers 110 move downwardly through ¾" with the jaws 88 (see FIGS. 14 to 17). The follower surfaces 113 of the followers 110 engage the flared cam surfaces 109 of the cam 102 and, as a result, the jaws 88 are swung toward their open positions to release the screw 31 as shown in FIG. 17. Because the jaws move faster than the socket, they move downwardly away from the socket during the initial portion of the downstroke and are swung open by the cam and cam followers well before the socket proceeds downwardly to the level of the jaws.

During the next ¼" downstroke of the socket 37, the jaws 88 are retracted out of the path of the socket and are shifted to the supply tube 57 by the pivoting bellcrank 62 (see FIGS. 18 and 19). As the jaws retract, the cam followers 110 are retracted outwardly off of the cam surfaces 109 to enable the spring 101 to quickly snap the jaws to their closed positions. As the jaws close, the lips 112 of the cam followers 110 move into the elongated notches 114 of the cam 102.

After the closed jaws 88 have received the next screw 31 from the supply tube 51 (see FIGS. 20 and 21), the jaws are shifted inwardly as the socket 37 moves through the final portion of its upstroke (see FIGS. 22 and 23). As the jaws move inwardly, the outer sides of the lips 112 bear against the bottoms of the notches 114 and cause the cam 102 to swing inwardly about the pivot 104 and into partially surrounding relation with the socket as shown in FIGS. 22 and 23. As a result of the lips 112 of the followers 110 riding in the notches 114, they bypass the cam surfaces 109 and thus the latter are not effective to open the jaws 88 and cause the jaws to lose the screw 31. Because the cam is swung inwardly by the followers, the cam does not interfere with full inward shifting of the jaws. The lips 112 of the followers 110 gradually and automatically withdraw from the notches 114 as the followers progress upwardly (see FIGS. 24 and 25) and thus the motion of the followers along the notches does not effect the position of the jaws. As the followers withdraw from the notches, the spring 106 returns the cam outwardly about the pivot to properly position the cam for the next downstroke.

Accordingly, the unique coaction between the transversely swingable cam 102 and the transversely swingable followers 110 enables the jaws 88 to be cammed opened to release the screw 31 during the downstroke of the socket 37 and as the jaws are shifted outwardly while enabling the jaws to remain closed and grip the succeeding screw when the jaws are shifted inwardly during the upstroke of the socket. A separate power-operated actuator for controlling opening and closing of the jaws is not required.

Although the jaws 88 are fully closed at the time they transfer the screw 31 to and place the screw in the socket, they are opened just ever so slightly when the socket reaches the very end of its upstroke (see FIGS. 14 and 15). The slight opening of the jaws at that time enables the jaws to maintain control over the screw when the socket is at the top of its upstroke but prevents the jaws from gripping the screw so tightly as to strip the screw downwardly out of the socket when the jaws accelerate away from the socket during the initial portion of the downstroke of the socket.

To effect such slight opening of the jaws 88, threaded studs 116 (FIGS. 7 and 25) are screwed into the lower edge portions of the side brackets 96 near the outer ends thereof. The inboard ends of the studs engage the sides of a half-cylindrical cam member 117 which partially surrounds the lower end portion of the supply tube 57. Formed on the upper end portion of the cam member are very narrow outwardly projecting flares 118 (FIG. 25) which slope away from the outboard side of the cam member as they progress upwardly. When the socket reaches the very top of its upstroke (see FIGS. 24 and 25), the studs engage the flares and are cammed so as to cause the jaws to swing open just slightly and release the pressure of the jaws from the screw shank 34 so as to avoid pulling the screw from the socket 37 during the downstroke. The studs and flares coact to hold the jaws slightly open until the jaws have started downwardly and the opening action of the cam 102 has taken over.

The studs 116 are adjustably locked to the side brackets 96 by nuts 119 and may be adjusted to center the jaws 88 along one coordinate relative to the socket 37 and the supply tube 57. The stop screws 67 and 68 may be adjusted to center the jaws relative to the socket and the supply tube along the perpendicular (i.e., in and out) coordinate.

Screws 31 may be delivered pneumatically to the supply tube 57 one at a time and at high speed by way of a flexible tube 120 (FIGS. 2 and 11) connected to the upper end of the supply tube and in the manner disclosed in Dixon U.S. Pat. No. 4,002,265. Each screw is blown into the jaws 88 while the latter are closed and, in accordance with another feature of the invention, a safety catch 121 (FIG. 12) is located adjacent the lower end of the supply tube to prevent the blown screw from forcing open the spring-loaded jaws and shooting completely through the jaws. In this instance, the safety catch comprises a forked-shaped member formed with two horizontally spaced fingers 122 and secured to the lower end of the cam member 117 by a vertical pin 123. When the jaw unit 61 is shifted outwardly to the supply tube 57, the jaws 88 move between the fingers 122 of the safety catch 121 as shown in FIG. 12 and are held against being swung open by the force of the blown screw striking the jaws.

A gate 124 (FIGS. 5 and 6) is mounted on the lower end of the supply tube 57 and coacts with the jaws 88 to control the newly blown screw 31 until such time as the jaws shift the screw transversely away from the supply tube 57. As shown in FIGS. 6 and 10, the gate 124 comprises a pair of fingers 125 located directly beneath the end of the supply tube and directly above the safety catch 121 and pivotally supported on pins 126 depending from the cam member 117. A torsion spring 127 urges the fingers to a closed position in which the fingers define a circular opening having a diameter just slightly greater than that of the head 33 of the screw 31. When the jaws 88 shift outwardly, they move directly beneath the gate 124 as shown in FIG. 21 and the gate captivates the upper end portion of the head 33 of the newly blown screw while the shank 34 of the screw is captivated by the jaws. When the jaws are shifted away from the supply tube, the head of the screw cams against the fingers 125 and swings the fingers in opposite direction about the pins 126 to permit the screw to be moved radially away from the supply tube.

The machine 30 is completed by an ejector 128 (FIGS. 5 to 7) which is carried on the lower side of one of the jaws 88 adjacent the inner end thereof. As the jaws are shifted inwardly, the ejector precedes the jaws and knocks from the socket any screw 31 which may not have been driven and which may have been retained in the socket during its upstroke.

I claim:

1. A machine for assembling fasteners with a workpiece, said machine comprising a driver for holding a fastener, means for advancing the driver toward the workpiece through an active stroke to drive the fastener and for retracting the driver away from the workpiece through a return stroke, and means movable in the same direction as and at a faster speed than the driver during part of said return stroke for delivering a fastener to the driver during the return stroke.

2. A machine for assembling polygonal fasteners with a workpiece, said machine comprising a socket for holding and driving a polygonal fastener, means for advancing the socket linearly toward the workpiece through an active stroke to drive the fastener and for retracting the socket linearly away from the workpiece through a return stroke, means for rotating the socket during the active and return strokes, and means movable substantially linearly in the same direction as the socket during said return stroke and at a speed greater than the speed of the socket for loading a fastener into the socket during the return stroke and while the socket is rotating.

3. A machine as defined in claim 2 in which said loading means comprise a holder adapted to grip and release a fastener, said holder being mounted to move back and forth along a path coinciding substantially with a portion of the path traveled by said socket during the active and return strokes of the socket, said holder also being mounted to move transversely into and out of the path of the socket, means for moving the holder transversely into the path of the socket during the return stroke of the socket and after the socket has passed the holder, means for thereafter moving said holder along said path and toward said socket at a speed greater than the speed of the socket during the return stroke thereby to enable the holder to load the fastener into the socket, means for moving said holder in the same direction as the socket and at a speed greater than the speed of the socket during the initial portion of the active stroke of the socket thereby to move the holder away from the socket, and means for thereafter shifting said holder transversely out of the path of the socket.

4. A machine as defined in claim 3 in which said holder comprises a pair of jaws mounted to move between closed and open positions to grip and release the fastener, means biasing said jaws to said closed positions, a cam for momentarily forcing said jaws open as said holder is moved away from said socket and is shifted transversely out of the path of the socket, said cam permitting said jaws to stay closed as said holder is shifted transversely into the path of the socket and is moved along said path toward said socket.

5. A machine as defined in claim 4 in which said cam is mounted to move transversely inwardly and outwardly, means urging said cam transversely outwardly, and means on said holder for moving said cam transversely inwardly as said holder is shifted transversely into the path of the socket.

6. A machine as defined in claim 5 in which said last-mentioned means comprises a cam follower on said holder, a cam surface on said cam and engageable with said follower to open said jaws as said holder is moved away from said socket and is shifted transversely out of the path of the socket, and a recess in said cam for receiving said follower when said holder is shifted transversely into the path of the socket whereby said follower moves said cam transversely inwardly, said recess being elongated generally in the direction of the path of said socket to permit said follower to withdraw from the recess as said holder is moved along said path toward said socket.

7. A machine as defined in claim 4 further including an additional cam for moving said jaws to slightly open positions after the jaws have placed the fastener in said socket and before the socket begins its active stroke.

8. A machine as defined in claim 3 in which said holder comprises a pair of jaws mounted to move between fully closed and fully open positions to grip and release the fastener, a cam for moving said jaws to slightly open positions after the jaws have placed the fastener in the socket and before the socket begins its active stroke, means for moving said jaws to said fully open positions during initial movement of the socket through its active stroke, and means for moving said jaws to said fully closed positions as said jaws are moved transversely out of the path of the socket and for keeping said jaws in said fully closed positions until the jaws are moved to said slightly open positions by said cam.

9. A machine as defined in claim 8 further including a spring biasing said jaws toward said closed positions, means for supplying a fastener to said jaws after said jaws have been moved transversely out of the path of the socket and while said jaws are in said closed positions, latching means augmenting said spring and engaging said jaws to positively hold said jaws in said closed positions while said fastener is supplied to said jaws, said latching means releasing said jaws for movement from their closed positions as said jaws are moved transversely toward the path of said socket.

10. A machine as defined in claim 9 in which said supplying means comprises a tube through which the fastener is conveyed to said jaws, gate means on the discharge end of said tube for holding part of the fastener while another part of the fastener is held by said jaws, and means permitting said gate means to open as said jaws are initially moved transversely toward the path of said socket.

11. A machine as defined in claim 3 further including an ejector on said holder and projecting ahead of said holder when the holder is moved into the path of the socket, said ejector knocking from the socket any fastener retained in the socket after the socket completes its active stroke and moves through its return stroke.

12. A machine for assembling screws having polygonal heads with a workpiece, said machine comprising a socket for holding and driving a screw with a polygonal head, means for advancing the socket linearly toward the workpieces through an active stroke to drive the screw and for retracting the socket linearly away from the workpiece through a return stroke, means for rotating the socket during the active stroke, a holder comprising a pair of jaws mounted to move between closed and open positions to grip and release a screw, means mounting said holder to enable said jaws to move transversely into and out of the path of the socket, means mounting said holder to enable said jaws to move back and forth along a path coinciding substantially with a portion of the linear path of the socket, means for delivering a screw to the jaws while the jaws are retracted out of the path of the socket, means for moving the jaws transversely into the path of the socket during the return stroke of the socket and after the socket has passed the jaws, means for thereafter moving said jaws along said path and toward said socket at a speed greater than the speed of the socket during the return stroke thereby to enable the jaws to telescope the head of the screw into the socket, means for moving said jaws in the same direction as the socket and at a speed greater than the speed of the socket during the initial portion of the active stroke of the socket thereby to move the jaws away from the socket, means for camming said jaws to said open positions as said jaws move away from the socket, means for thereafter shifting said jaws transversely out of the path of the socket, and means for closing said jaws before the jaws are returned transversely into the path of the socket.

13. A machine as defined in claim 12 in which said closing means comprise a spring urging said jaws to said closed positions, said camming means comprising a cam for momentarily forcing said jaws open as said jaws are moved away from said socket and are shifted transversely out of the path of said socket, said cam permitting said jaws to stay closed as said jaws are shifted transversely into the path of the socket and are moved along said path toward said socket.

14. A machine as defined in claim 13 in which said cam is mounted to move transversely inwardly and outwardly, means urging said cam transversely outwardly, and means on said holder for moving said cam transversely inwardly as said jaws are shifted transversely into the path of the socket.

15. A machine for assembling fasteners with a workpiece, said machine comprising a driver, means for advancing the driver toward the workpiece through an active stroke to drive the fastener and for retracting the driver away from the workpiece through a return stroke, a holder comprising a pair of jaws mounted to move between closed and open positions to grip and release a fastener, means mounting said holder to enable said jaws to move transversely into and out of the path of the driver, means mounting said holder to enable said jaws to move back and forth along a path coinciding substantially with a portion of the path of the driver, means for delivering a fastener to the jaws while the jaws are retracted out of the path of the driver, means for moving the jaws transversely into the path of the driver during the return stroke of the driver and after the driver has passed the jaws, means for moving said jaws in the same direction as the driver during the initial portion of the active stroke of the driver, means for camming said jaws to said open positions as said jaws move in the same direction as the driver during the active stroke of the driver, means for thereafter shifting said jaws transversely out of the path of the driver, and means for closing said jaws before the jaws are returned transversely into the path of the socket.

* * * * *